US007762185B2

(12) United States Patent
Machaj et al.

(10) Patent No.: US 7,762,185 B2

(45) Date of Patent: Jul. 27, 2010

(54) INBOARD CANTILEVER CYLINDER SUPPORT FOR PRINTING PRESSES

(75) Inventors: Dan Machaj, Romeoville, IL (US); Thaddeus A. Niemiro, Lisle, IL (US); Thomas W. Orzechowski, Carol Stream, IL (US)

(73) Assignee: Goss International Corporation, Bolingbrook, IL (US)

( * ) Notice: Subject to any disclaimer, the term of this patent is extended or adjusted under 35 U.S.C. 154(b) by 372 days.

(21) Appl. No.: 11/238,193

(22) Filed: Sep. 29, 2005

(65) Prior Publication Data

US 2006/0081140 A1 Apr. 20, 2006

Related U.S. Application Data

(60) Provisional application No. 60/614,786, filed on Sep. 29, 2004.

(51) Int. Cl.

| | |
|---|---|
| ***B41F 5/00*** | (2006.01) |
| ***B41F 5/04*** | (2006.01) |
| ***B41F 13/02*** | (2006.01) |
| ***B41F 13/20*** | (2006.01) |
| ***B41L 5/16*** | (2006.01) |
| ***B41L 15/14*** | (2006.01) |
| ***B41L 49/00*** | (2006.01) |
| ***B25F 5/02*** | (2006.01) |
| ***F16C 13/00*** | (2006.01) |
| ***B05C 1/08*** | (2006.01) |

(52) U.S. Cl. ........................ 101/216; 101/219; 101/479; 101/480; 492/15; 492/18

(58) Field of Classification Search ................. 101/212, 101/216, 219, 479, 480; 492/15, 18

See application file for complete search history.

(56) References Cited

U.S. PATENT DOCUMENTS 3,847,079 A * 11/1974 Dahlgren .................... 101/490

(Continued)

FOREIGN PATENT DOCUMENTS

DE 29601150 U1 5/1996

(Continued)

OTHER PUBLICATIONS

International Search Report received in International (PCT) Application PCT/US2005/035068, by the European Patent Office dated Jan. 23, 2006.

(Continued)

*Primary Examiner*—Judy Nguyen
*Assistant Examiner*—Leo T Hinze
(74) *Attorney, Agent, or Firm*—Marshall, Gerstein & Borun LLP

(57) ABSTRACT

A printing press having inboard cantilevered cylinder supports is disclosed. The press includes a frame with a drive side spaced from a non-drive side, and the press includes a cylinder defining an having an axis and having a drive end and a non-drive end. The drive end includes a drive aperture extending axially into the cylinder and a splined insert mounted within the drive aperture, while the non-drive end includes a non-drive aperture extending axially into the cylinder. A drive shaft is rotatably mounted to the drive side of the frame and is arranged for connection to a power source. The drive shaft includes a spline sized to engage the splined insert and is arranged to a portion of the cylinder, while a mandrel carried by the non-drive side of the frame extends into the non-drive aperture and is arranged to support another portion of the cylinder.

30 Claims, 3 Drawing Sheets

U.S. PATENT DOCUMENTS

| | | | | |
|---|---|---|---|---|
| 5,647,275 | A * | 7/1997 | Lupa et al. | 101/216 |
| 5,894,796 | A | 4/1999 | Gelinas et al. | |
| 6,318,257 | B1 * | 11/2001 | Niemiro et al. | 101/212 |
| 6,435,087 | B1 | 8/2002 | Gloeckner | |
| 2001/0006025 | A1 | 7/2001 | Gottling et al. | |
| 2006/0266236 | A1 * | 11/2006 | Rasch et al. | 101/216 |

FOREIGN PATENT DOCUMENTS

| | | | |
|---|---|---|---|
| FR | 2291402 | A1 | 6/1976 |
| WO | WO 2004103706 | A2 * | 12/2004 |

OTHER PUBLICATIONS

Written Opinion for Application PCT/US2005/035068 by the European Patent Office dated Jan. 23, 2006.

* cited by examiner

INBOARD CANTILEVER CYLINDER SUPPORT FOR PRINTING PRESSES

RELATED APPLICATIONS

The present invention claims priority under 35 U.S.C. §119 (e) from U.S. Provisional Application Ser. No. 60/614,786, filed Sep. 29, 2004, the entire disclosure of which is incorporated herein.

FIELD OF THE DISCLOSURE

The present disclosure relates to printing presses, and more particularly to an improved cylinder support for printing presses that may improve the dynamic stability of the printing cylinders mounted on the printing press.

BACKGROUND OF THE INVENTION

On printing presses, conventional cylinders typically have a support shaft protruding from each end. These support shafts typically are integrally formed with the balance of the cylinder by turning down the ends of the cylinder. The protruding ends of the cylinder then are mounted to the supporting frame of the printing press using journal support bearings.

Such a conventional configuration creates a relatively long span for the printing cylinder. As is known, the longer the span of a printing cylinder, the more the cylinder is subject to bending forces. These bending forces cause the middle of the cylinder to deflect or sag to some extent. In printing presses, the normal structural sag of a cylinder may contribute to dynamic instability during operation of the printing press. Accordingly, improvements in cylinder design and/or support may lessen the amount of cylinder deflection.

SUMMARY OF THE INVENTION

In accordance with an aspect of the invention, a printing press having an inboard cantilever cylinder support comprises a frame having a drive side and a non-drive side, a cylinder having an axis and a drive end and a non-drive end. A drive aperture extends axially into the cylinder from the drive end, while a non-drive aperture extends axially into the cylinder from the non-drive end. A drive shaft is rotatably mounted to the drive side of the frame and is arranged for connection to a power source, while a drive coupling is disposed within the drive aperture of the cylinder and operatively connects the drive shaft to the drive aperture. A mandrel is carried by the non-drive side of the frame and extends into the non-drive aperture.

In further accordance with a preferred embodiment, the drive coupling is a splined connection, and a portion of the drive shaft is positioned to support the drive end of the cylinder. The drive shaft may be supported on the drive side of the frame by a first bearing set, and the non-drive end of the cylinder is supported on the mandrel by a second bearing set disposed within the non-drive aperture. The drive shaft and/or the mandrel may include one or more lubrication ports in flow communication with the drive coupling or the bearing set supported by the mandrel.

Each of the mandrel and the drive shaft may be supported on the sides of the press frame by an eccentric connection. Suitable seals may be disposed adjacent the non-drive end of the cylinder and encircling the mandrel, or around the drive shaft at the outer end of the drive side aperture. A sidelay registration mechanism may be provided to shift the cylinder axially relative to the frame. The mandrel may include a bearing set disposed within the non-drive aperture and rotatably supporting the non-drive end of the cylinder, and the sidelay registration mechanism may include an adjuster rod extending through the mandrel to the bearing set and arranged to shift the bearing set axially relative to the mandrel. The bearing set on the mandrel may include a race fixed within the non-drive aperture.

In accordance with another aspect of the invention, a printing press having inboard cantilevered cylinder supports includes a frame with a drive side spaced from a non-drive side, and the press includes a cylinder defining an having an axis and having a drive end and a non-drive end. The drive end includes a drive aperture extending axially into the cylinder and a splined insert mounted within the drive aperture, while the non-drive end includes a non-drive aperture extending axially into the cylinder. A drive shaft is rotatably mounted to the drive side of the frame and is arranged for connection to a power source. The drive shaft includes a spline sized to engage the splined insert and is arranged to a portion of the cylinder, while a mandrel carried by the non-drive side of the frame extends into the non-drive aperture and is arranged to support another portion of the cylinder.

In another aspect, a method of supporting a cylinder on a printing press comprises forming a drive side aperture in a drive end of the cylinder, forming a non-drive side aperture in a non-drive end of the cylinder, providing a cantilevered driveshaft mountable to a drive side of the frame and arranged for connection to a power source, and providing a cantilevered mandrel mountable to a non-drive side of the frame. A drive coupling is disposed inside the drive side aperture and operatively couples the drive end of the cylinder to the drive shaft and permits the driveshaft to support a first portion of the cylinder, while providing a bearing set disposed within the non-drive aperture permits support of a second portion of the cylinder.

DETAILED DESCRIPTION OF THE DISCLOSURE

Although the following text sets forth a detailed description of one or more exemplary embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

Figure 1:
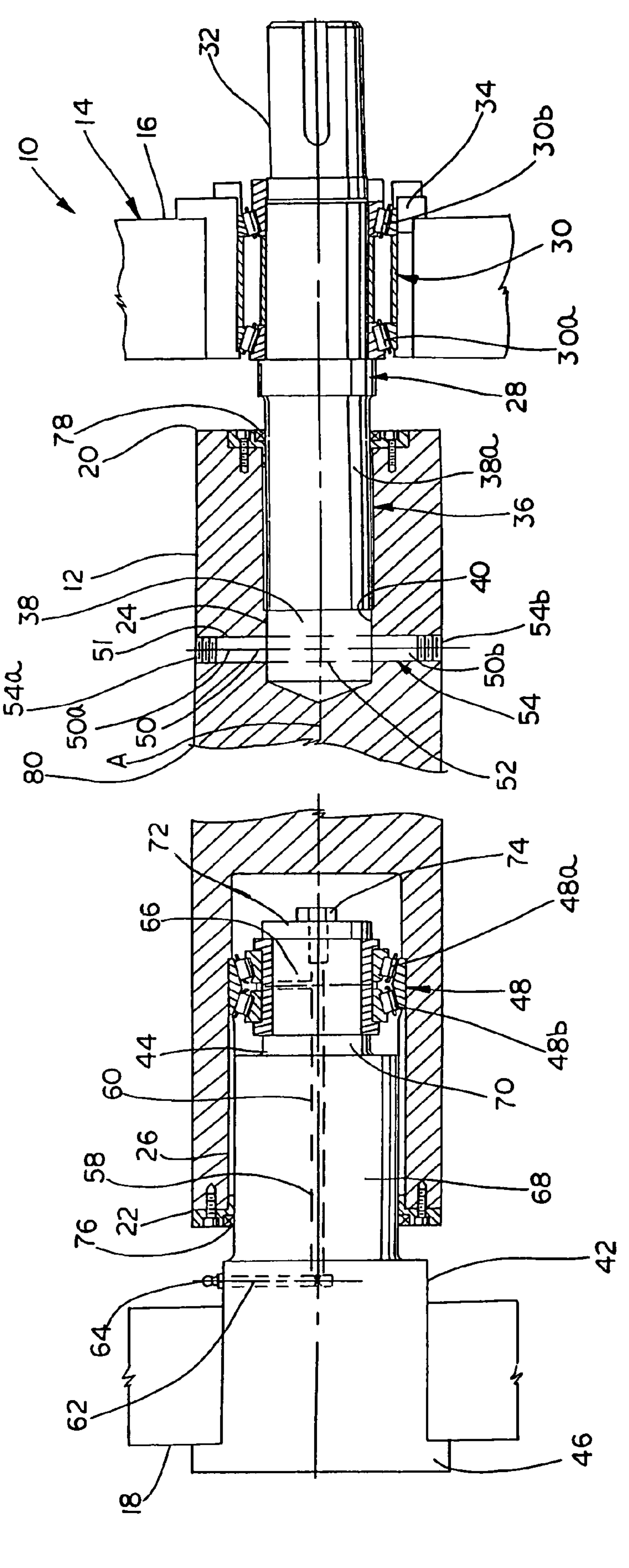
FIG. 1 is a cross-sectional view of a printing press having a cylinder supported in accordance with the teachings of a first disclosed example of the present invention.

Referring now to FIG. 1, a printing press 10 having a cylinder 12 and assembled in accordance with the teachings of a first disclosed example of the present invention is shown. The cylinder 12 of FIG. 1 is a blanket cylinder, although many aspects of the embodiment of FIG. 1 may be applied to a plate cylinder or any other form of cylinder typically supported in a printing press. It will be understood that the cylinder 12 may have a removable sleeve (not shown) as may commonly be employed in the art. The printing press 10 includes a frame 14 having a drive side 16 and a non-drive side 18. The cylinder 12 includes a drive end 20, a non-drive end 22, and defines a longitudinal axis A.

A drive aperture 24 extends into the drive end 20 of the cylinder 12, while a non-drive aperture 26 extends into the non-drive end 22 of the cylinder 12. A driveshaft 28 is rotatably mounted to the drive side 16 of the frame 14 by a bearing set 30, and an outer end 32 of the driveshaft 28 is arranged for connection to a power source such as a drive motor (not shown) of the type commonly employed on printing presses. Preferably, the bearing set 30 is mounted within an eccentric adjuster 34 which permits the cylinder 12 to be shifted in a direction perpendicular to the axis A. In the disclosed example, the bearing set 30 has a first bearing 30*a* and a second bearing 30*b*. A drive coupling 36 operatively connects an inner portion 38 of the shaft 28 to and inner surface 40 of the drive aperture 24, such that rotation of the driveshaft 28 about its longitudinal axis will cause rotation of the cylinder 12 about its axis A.

A mandrel 42 is mounted to the non-drive side 18 of the frame 14, and an inner portion 44 of the mandrel 42 is disposed inside the non-drive aperture 26. The mandrel 44 is mounted to an eccentric adjuster 46 which, in conjunction with the eccentric adjuster 34, permits the cylinder 12 to be shifted in a direction perpendicular to the axis A. The inner portion 44 of the mandrel 42 supports a portion of the cylinder 12 using a bearing set 48 disposed inside the non-drive aperture 26, while the inner portion 38 of the driveshaft 28 supports another portion of the cylinder 12. Preferably, the bearing set 48 will have a pair of bearings 48*a* and 48*b*.

The driveshaft 28 is mounted to the drive side 16 of the frame 14 (or mounted to the eccentric adjuster 34) such that the inner portion 38 of the driveshaft 28 extends inwardly from the drive side 16 in cantilever fashion. Similarly, the mandrel 42 is mounted to the non-drive side 18 of the frame 14 (or mounted to the eccentric adjuster 46) such that the inner portion 44 of the mandrel 42 extends inwardly from the non-drive side 18 and cantilever fashion. In the example of FIG. 1, the drive coupling 36 is achieved by a cross pin 50 which extends through a bore 51 extending through the cylinder 12. The cross pin 50 includes a pair of ends 50*a* and 50*b*, which may be welded to the cylinder at 54*a* and 54*b* and smoothed down. The inner portion 38 of the driveshaft 28 includes a bore 52 which may be generally aligned with the bore 51 and which also receives the pin 50. The inner portion 38 may have a diameter slightly larger than another portion 38*a* of the driveshaft 28, and the inner portion 38 is preferably press-fit into the drive aperture 24 and secured using the pin 50. Consequently, the load on the drive side 20 is carried primarily by the inner portion 38 as opposed to being carried by the portion 38*a*. Preferably, the drive coupling 36 may allow axial movement of the cylinder 12. In the example of FIG. 1, a sidelay registration mechanism is not provided.

The mandrel 42 includes a lubrication port 58 having a first portion 60 that extends toward the inner portion 44 of the mandrel 42, and a second portion 62 that extends to a grease fitting 64. The lubrication for 58 provides suitable lubrication to the bearing set 48 on the inner portion 44 of the mandrel 42. The lubrication port 58 may include a third portion 66 that connects the innermost part of the lubrication port 58 to the bearing set 48.

The mandrel 42 includes a first part 68 having a first diameter, and a second part 70 having a reduced diameter. The bearing set 48 is mounted to the second part 70. Preferably, an inner race 72 of the bearing set 48 may be mounted about the second part 70, and may be secured with an end cap 72 secured by a suitable bolt 74. Still preferably, a seal 76 is mounted to the non-drive end 22 of the cylinder 12 and encircles the first part 68 of the mandrel 42. The seal 76 may be removable using a series of attachment bolts, screws or other suitable fasteners. A seal 78 may be connected to the drive side 16 of the cylinder 12 in a similar fashion.

In operation, upon connecting the driveshaft 28 to a suitable power source as described above, it will be appreciated that rotation of the driveshaft 28 about it's axis (which is substantially coaxial with the axis A of the cylinder 12) causes rotation of the cylinder 12. The cantilevered driveshaft 28 supports the drive end 20 of the cylinder 12 at a point spaced inwardly along the axis A from the drive end 20. Similarly, the non-drive end 22 of the cylinder 12 is supported on the bearing set 48 carried by the inner portion 44 end of the cantilevered mandrel 42, such that the non-drive end 22 of the cylinder 12 is supported at point space inwardly along the axis from the non-drive and 22. Consequently, in accordance with the disclosed example, any deflection measured at a central portion 80 will be less than the measured deflection of a conventional cylinder having the same the same length measured from the drive end 20 to the non-drive end 22, but having the conventional protruding shafts. Consequently, the cylinder 12 assembled in accordance with the teachings of the present invention may experience less dynamic instability during operation of the printing press. This lessened dynamic instability may be achieved, at least in part, by a shorter effective length between the points of support.

Figure 2:
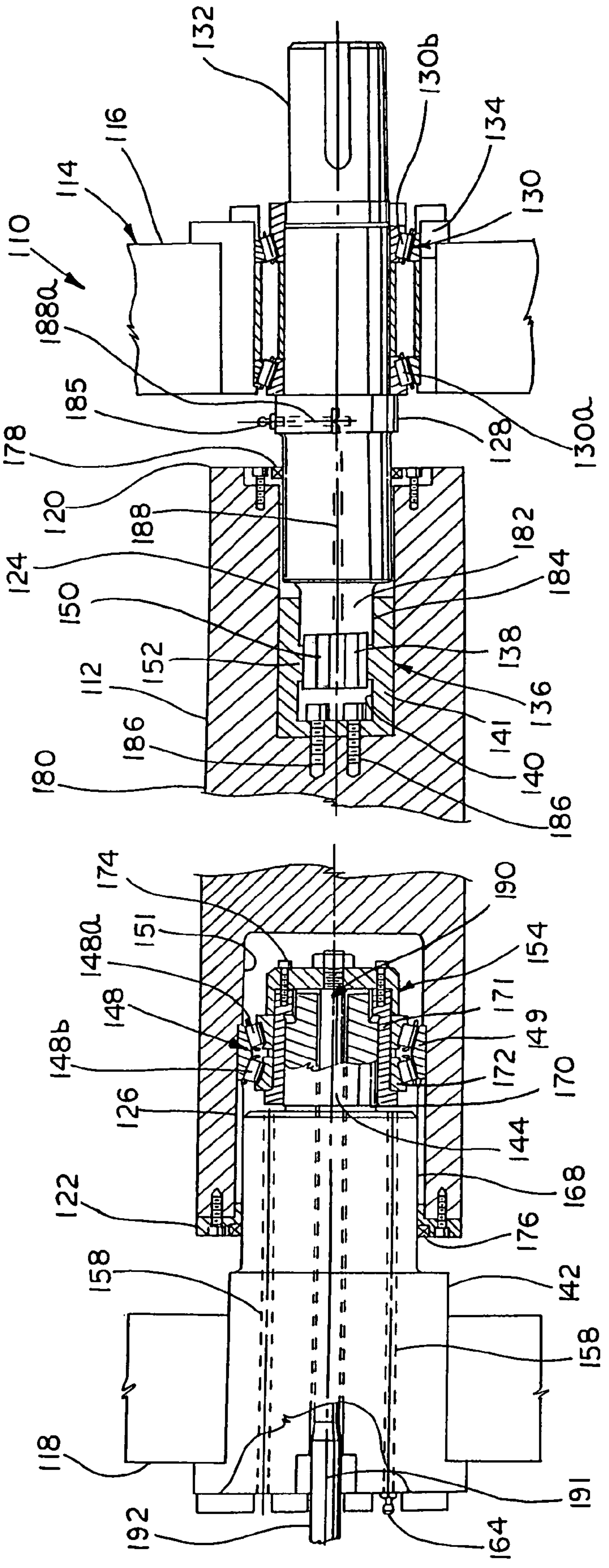
FIG. 2 is a cross-sectional view of her parting press getting a cylinder supported in accordance with the teachings of a second disclosed example of the present invention.

Referring now to FIG. 2, a printing press 110 having a cylinder 112 and assembled in accordance with the teachings of a second disclosed example of the present invention is shown. To the extent possible, the components of the printing press 110 will have the same reference numerals used in the description of the first described embodiment, although the reference numerals will be increased by one hundred. In the example of FIG. 2, the cylinder 112 is a plate cylinder and thus includes a sidelay registration mechanism (explained below), although certain aspects of FIG. 2 may be employed to support other cylinders. The cylinder 112 may have a removable sleeve (not shown) as may commonly be employed in the art.

The printing press 100 includes a frame 114 having a drive side 116 and a non-drive side 118. The cylinder 112 includes a drive end 120, a non-drive end 122, and defines a longitudinal axis A. A drive aperture 124 extends into the drive end 120 of the cylinder 112, while a non-drive aperture 126 extends into the non-drive end 122 of the cylinder 112. A driveshaft 128 is rotatably mounted to the drive side 116 of the frame 114 by a bearing set 130, and an outer end 132 of the driveshaft 128 is arranged for connection to a power source such as a drive motor (not shown) of the type commonly employed on printing presses. Preferably, the bearing set 130 is mounted within an eccentric adjuster 134 which permits the cylinder 112 to be shifted in a direction perpendicular to the axis A. In the disclosed example, the bearing set 130 has a first bearing 130*a* and a second bearing 130*b*. A drive coupling 136 operatively connects an inner portion 138 of the shaft 128 to the cylinder 112 in order to transmit rotation of the shaft 128 to the cylinder 112. A mandrel 142 is mounted to the non-drive side 118 of the frame 114, and an inner portion 144 of the mandrel 142 is disposed inside the non-drive aperture 126. The mandrel 142 is mounted to an eccentric adjuster 146 which, in conjunction with the eccentric adjuster 134, permits the cylinder 112 to be shifted in a direction perpendicular to the axis A.

The inner portion 144 of the mandrel 142 supports a portion of the cylinder 112 using a bearing set 148 disposed inside the non-drive aperture 126, while the inner portion 138 of the driveshaft 128 supports another portion of the cylinder 112. Preferably, the bearing set 148 will have a pair of bearings 148*a* and 148*b*.

The driveshaft 128 is mounted to the drive side 116 of the frame 114 (or mounted to the eccentric adjuster 134) such that the inner portion 138 of the driveshaft 128 extends inwardly from the drive side 116 in cantilever fashion. Similarly, the mandrel 142 is mounted to the non-drive side 118 of the frame 114 (or mounted to the eccentric adjuster 146) such that the inner portion 144 of the mandrel 142 extends inwardly from the non-drive side 118 in cantilever fashion.

In the example of FIG. 2, the drive coupling 136 is achieved by a series of splines 150 formed on the inner portion 138 of the driveshaft 128, which mate with a series of splines 152 formed on an inner surface 140 of a cup insert 141, which is sized to be mounted within the drive aperture 124. Preferably, the drive coupling 136 may allow axial movement of the cylinder 112 as will be explained in greater detail below. In the example of FIG. 2, a sidelay registration mechanism 154 which will be described in greater detail below. The splines 152 may be female splines machined into the inner surface of the cup insert 141, while the splines 150 on the shaft 128 may be male splines. Although not all of the splines 150 and 152 can be seen in the drawing, it will be appreciated that the splines 150 generally surround the inner portion 138 of the drive shaft 128, while the splines 152 generally surround the inner surface of the cup insert 141.

The inner portion 138 of the driveshaft 128 includes a bearing face 182, with the bearing face 182 being formed generally adjacent to the splines 150. The cup insert 141 also includes a bearing face 184, such that the bearing faces 182 and 184 mate to support the drive end 120 of the cylinder 112. The cup insert 141 is sized for insertion in the drive aperture 124, and can be secured by suitable fastening bolts 186. As can be seen in FIG. 2, the diameter of the portion of the driveshaft 128 carrying the splines 150 is slightly less then the diameter of that portion of the driveshaft 128 having the bearing face 182, and the diameter of the splines 152 on the cup insert 141 is less than the diameter of the bearing face 184 on a cup insert 141. This difference in diameters may permit easier assembly, and also facilitates sidelay registration adjustment.

The mandrel 142 includes one or more lubrication ports 158 that extend through the mandrel 142 to a point generally adjacent the bearing set 148. Once again, a suitable grease fitting 164 is provided. The mandrel 142 includes a first part 168 having a first diameter, and a second part 170 having a reduced diameter, and the bearing set 148 is mounted to the smaller second part 170. Preferably, an inner race 172 of the bearing set 148 may be mounted about the second part 170 using a bearing support 171, which may be a generally cylindrical sleeve or cup sized to fit over the second part 170. The bearing support 171 may be secured using suitable bolts 174. Still preferably, a seal 176 is mounted to the non-drive end 122 of the cylinder 112 and encircles the first part 168 of the mandrel 142. The seal 176 may be removable using a series of attachment bolts, screws or other suitable fasteners. A seal 178 may be connected to the drive side 116 of the cylinder 112 in a similar fashion.

Preferably, a lubrication port 188 extends generally axially through the drive shaft 128 to route lubrication toward the inner portion 138 of the driveshaft 128. The lubrication port 188 permits the splines 150, 152 in the bearing faces 180, 182 to be lubricated. A grease fitting 185 is carried by the driveshaft 128 and includes a port 188*a* that intersects the port 188.

A sidelay registration mechanism 190 includes an adjuster rod 191 connected to the bearing support 171. An outer end 192 of the adjuster rod extends from the outer end mandrel 142. The sidelay registration mechanism 190 is described in greater detail below with respect to FIG. 3.

Figure 3:
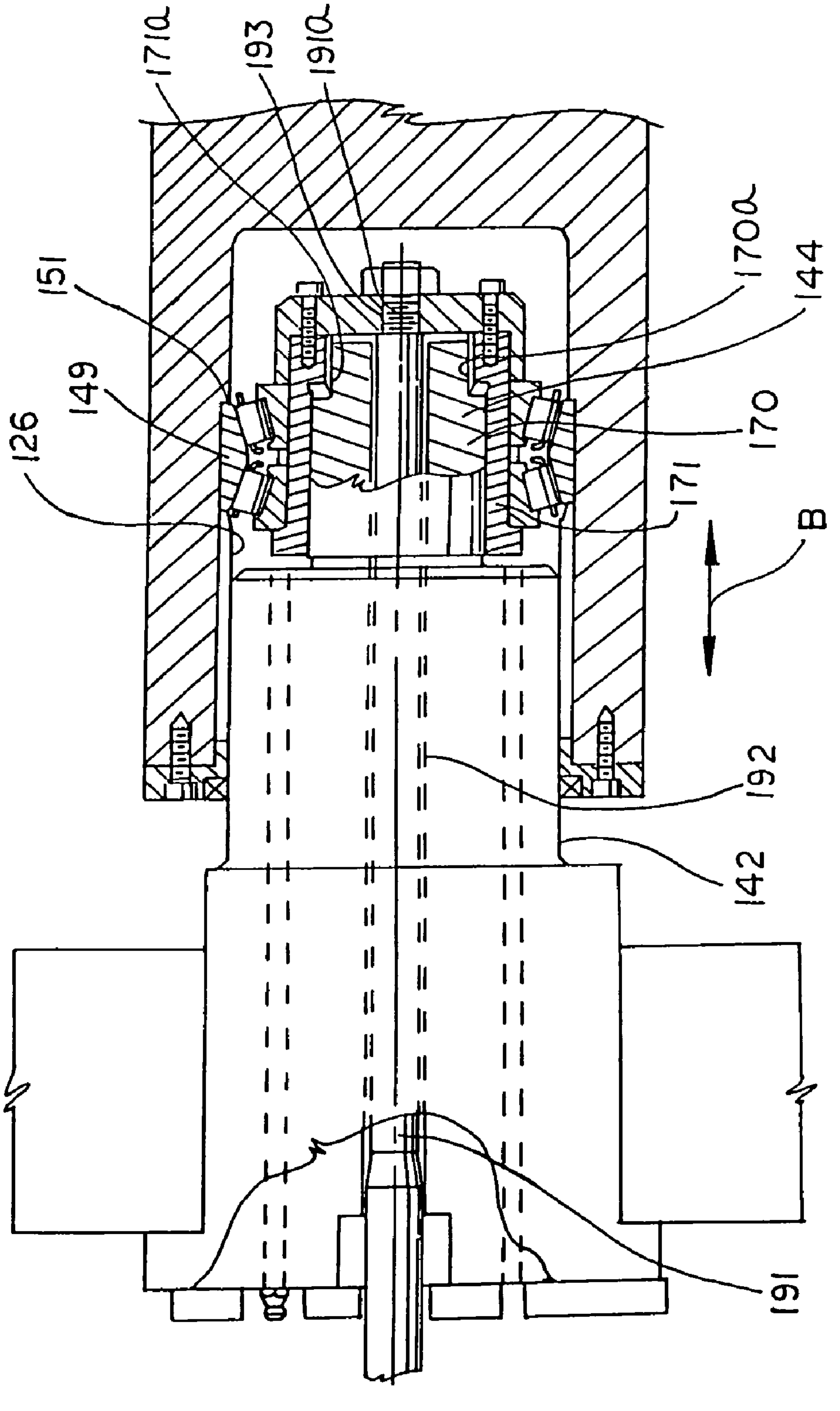
FIG. 3 is an enlarged fragmentary cross-sectional view of an exemplary sidelay registration mechanism.

Referring now to FIG. 3, the inner portion 144 of the mandrel 142 is shown, and more specifically, the second part 170 is shown. The adjuster rod 191 includes a threaded portion 191*a* and is shown extending through a bore 192 formed in the mandrel 142. The bearing support 171 is slidably mounted to the second part 170 of the mandrel 142. The bearing support 171 includes a threaded aperture 193 which engages the threaded portion 191*a* of the adjuster rod 191. A reduced diameter portion 171*a* of the bearing support 171 fits over a reduced diameter portion 170*a* of the second part 170 of the mandrel 142. By virtue of the threaded portion 191*a* of the adjuster rod 191 engaging the threaded aperture 193 of the bearing support 171, rotation of the adjuster rod 191 causes the bearing support 171 to shift back and forth parallel to an adjustment axis B relative to the mandrel 142. In order to rotate the adjuster rod 191, a suitable tool (not shown) may be attached to the outer end 192 (shown in FIG. 2) of the adjuster rod 191. Finally, an outer race 149 (shown in FIG. 2) of the bearing set 148 can be secured to an inner surface 151 of the non-drive aperture 126. Consequently, when the bearing support 171 is moved in either direction along the axis B, the entire bearing set 148 moves relative to the axis B. Because the inner race is secured to the inner surface 151 of the cylinder 112, the cylinder 112 will move along its axis A (which is parallel to the axis B).

In operation, upon connecting the driveshaft 128 to a suitable power source as described above, it will be appreciated that rotation of the driveshaft 128 about its axis causes rotation of the cylinder 112 in a manner similar to that discussed above with respect to the first disclosed example. Once again, the cantilevered driveshaft 128 supports the drive end 120 of the cylinder. 112 at a point spaced inwardly along the axis A from the drive end 120, while the non-drive end 122 of the cylinder 112 is supported on the bearing set 148 carried by the inner portion 144 of the cantilevered mandrel 142, such that the non-drive end 122 of the cylinder 112 is supported at point space inwardly along the axis from the non-drive end 122.

Consequently, in accordance with the disclosed example, any deflection measured at a central portion of the cylinder 12 or 112 will be less than the measured deflection of a conventional cylinder having the same the same length measured from the drive end to the non-drive end, but having the conventional protruding shafts. For example, if the user desires a maximum deflection of the central portion 80 or 180 of the cylinders 12 or 112 to measure in the range of 1-2 thousandths of an inch, and the user knows the bending moment of inertia based on the cross section of the cylinder and the material properties of the cylinder, then the user can calculate how far inboard the support points need to be (measuring inboard from the ends of the cylinders toward the central portion of the cylinder) in order to ensure that the desired maximum deflection is not exceeded.

The present disclosure provides a method and apparatus for an improved method of supporting printing cylinders between the frames of a printing press. The present disclosure utilizes cylinder journals or supports which are not an integral part of the cylinder itself, but are rigidly mounted in the press frames. The cylinder supports are inserted into the cylinder to effectively shorten the cylinder span between the supports, and thus may improve the dynamic stability of the printing cylinders.

What is claimed:

1. A printing press comprising:

a frame having a drive side and a non-drive side;

a cylinder having an axis, a drive end and a non-drive end;

a drive aperture extending axially into the cylinder from the drive end;

a non-drive aperture extending axially into the cylinder from the non-drive end;

a drive shaft rotatably mounted to the drive side of the frame and arranged for connection to a power source;

a drive coupling disposed within the drive aperture of the cylinder and disposed axially inward of the drive end of the cylinder and operatively connecting the drive shaft to the drive aperture at a location axially inward of the drive end of the cylinder; and a mandrel carried by the non-drive side of the frame and extending into the non-drive aperture, the mandrel including a first portion having a first diameter and a second portion having a reduced diameter, the mandrel rotatably supporting the non-drive end of the cylinder, wherein the drive shaft is supported on the drive side of the frame by a first bearing set, and wherein the non-drive end of the cylinder is supported on the mandrel by a second bearing set disposed within the non-drive aperture, the second bearing set being mounted about the second portion of the mandrel.

2. The printing press of claim 1, wherein the drive coupling is a splined connection.

3. The printing press of claim 1, wherein a portion of the drive shaft is positioned to support the drive end of the cylinder.

4. The printing press of claim 1, wherein the drive coupling is positioned to support the drive end of the cylinder.

5. The printing press of claim 1, wherein the drive shaft includes a lubrication port in flow communication with the drive coupling, and wherein the mandrel includes a lubrication port in flow communication with the second bearing set.

6. The printing press of claim 1, wherein the drive shaft is supported on the drive side of the frame by an eccentric connection, and wherein the mandrel is supported on the non-drive side of the frame by an eccentric connection.

7. The printing press of claim 1, including a seal disposed adjacent the non-drive end of the cylinder and encircling the mandrel.

8. The printing press of claim 7, wherein the seal is mounted adjacent the non-drive end of the cylinder.

9. The printing press of claim 1, including a sidelay registration mechanism arranged to shift the cylinder axially relative to the frame.

10. The printing press of claim 1, including a sidelay registration mechanism operatively engaging the drive shaft.

11. A printing press comprising:

a frame having a drive side and a non-drive side;

a cylinder having an axis, a drive end and a non-drive end;

a drive aperture extending axially into the cylinder from the drive end;

a non-drive aperture extending axially into the cylinder from the non-drive end;

a drive shaft rotatably mounted to the drive side of the frame and arranged for connection to a power source;

a drive coupling disposed within the drive aperture of the cylinder and disposed axially inward of the drive end of the cylinder and operatively connecting the drive shaft to the drive aperture at a location axially inward of the drive end of the cylinder; and a mandrel carried by the non-drive side of the frame and extending into the non-drive aperture, the mandrel rotatably supporting the non-drive end of the cylinder via a bearing set disposed within the non-drive aperture at a location axially inward of the non-drive end of the cylinder, wherein the mandrel rotatably supports the non-drive end of the cylinder, and a sidelay registration mechanism has an adjuster rod extending through the mandrel to the bearing set and is arranged to shift the bearing set axially relative to the mandrel.

12. The printing press of claim 11, wherein the bearing set includes a race fixed within the non-drive aperture.

13. A printing press having a frame with drive side spaced from a non-drive side and comprising:

a cylinder defining an axis and having a drive end and a non-drive end;

the drive end including a drive aperture extending axially into the cylinder and a splined insert mounted within the drive aperture;

the non-drive end including a non-drive aperture extending axially into the cylinder;

a drive shaft rotatably mounted to the drive side of the frame and arranged for connection to a power source, the drive shaft including a spline sized to engage the splined insert, the drive shaft arranged to support first portion of the cylinder; and a mandrel carried by the non-drive side of the frame and extending into the non-drive aperture, the mandrel including a first portion having a first diameter and a second portion having a reduced diameter, the mandrel being arranged to support a second portion of the cylinder, wherein the drive shaft is supported on the drive side of the frame by a first bearing set and the non-drive end of the cylinder is supported on the mandrel by a second bearing set disposed within the non-drive aperture, and the second bearing set is mounted about the second portion of the mandrel.

14. The printing press of claim 13, wherein the drive shaft includes a bearing portion.

15. The printing press of claim 14, wherein the bearing portion is disposed adjacent the spline.

16. The printing press of claim 13, including a bearing support mounted to the second portion of the mandrel, and wherein the second bearing includes an outer race and an inner race, the outer race fixed to an inside portion of the non-drive aperture, the inner race mounted to the bearing support.

17. The printing press of claim 16, wherein the bearing support is removably mounted to the second portion of the mandrel.

18. The printing press of claim 13, wherein the drive shaft includes a lubrication port in flow communication with the drive aperture, and wherein the mandrel includes a lubrication port in flow communication with the second bearing set.

19. The printing press of claim 13, including a sidelay registration mechanism arranged to shift the cylinder axially relative to the frame.

20. A printing press having a frame with drive side spaced from a non-drive side and comprising:

a cylinder defining an axis and having a drive end and a non-drive end;

the drive end including a drive aperture extending axially into the cylinder and a splined insert mounted within the drive aperture;

the non-drive end including a non-drive aperture extending axially into the cylinder;

a drive shaft rotatably mounted to the drive side of the frame and arranged for connection to a power source, the drive shaft including a spline sized to engage the splined insert, the drive shaft arranged to support first portion of the cylinder; and a mandrel carried by the non-drive side of the frame and extending into the non-drive aperture, the mandrel arranged to support a second portion of the cylinder via a bearing set within non-drive aperture, wherein the mandrel-rotatably supports the non-drive end of the cylinder, and a sidelay registration mechanism has an adjuster rod extending through the mandrel to the bearing set and arranged to shift the bearing set axially relative to the mandrel.

21. A system for supporting a cylinder on a frame of a printing press, the frame having a drive side spaced from anon-drive side, the system comprising:

a cylinder defining an axis and having a drive end and a non-drive end;

the drive end including a drive aperture extending axially into the cylinder and a spline disposed within the drive aperture;

the non-drive end including a non-drive aperture extending axially into the cylinder;

a drive shaft arranged to be rotatably mounted to the drive side of the frame and arranged for connection to a power source, the drive shaft operatively coupled to the drive aperture at a location disposed axially inward from the drive side end, the drive shaft being supported on the drive side of the frame by a first bearing set;

a mandrel arranged to be mounted to the non-drive side of the frame and extending into the non-drive aperture, the mandrel including a first portion having a first diameter and a second portion having a reduced diameter, the mandrel being supported by a second bearing set mounted about the second portion of the mandrel and within the non-drive aperture; and the mandrel and the driveshaft being arranged to support the cylinder.

22. The system of claim 21, wherein the drive shaft includes a bearing portion, a portion of the cylinder supported on the bearing portion of the driveshaft.

23. The system of claim 21, including a cup sized for insertion in the drive side aperture, the spline of the drive side aperture formed in the cup, the cup further including a bearing portion sized to be supported by a bearing portion of the drive shaft.

24. The system of claim 23, wherein the cup is removably mounted to an inner portion of the drive side aperture.

25. A system for supporting a cylinder on a frame of a printing press, the frame having a drive side spaced from a non-drive side, the system comprising:

a cylinder defining an having an axis and having a drive end and a non-drive end;

the drive end including a drive aperture extending axially into the cylinder and a spline disposed within the drive aperture;

the non-drive end including a non-drive aperture extending axially into the cylinder;

a drive shaft arranged to be rotatably mounted to the drive side of the frame and arranged for connection to a power source, the drive shaft operatively coupled to the drive aperture at a location disposed axially inward from the drive side end; and a mandrel arranged to be mounted to the non-drive side of the frame and extending into the non-drive aperture and having a bearing set arranged to support the cylinder within the non-drive aperture;

wherein the mandrel and the driveshaft are arranged to support the cylinder, and the mandrel includes a bearing support axially movable on the mandrel and operatively coupled to an adjuster, and a bearing set supports the non-drive end of the cylinder, the bearing set having an inner race mounted to the bearing support and an outer race mounted to the cylinder.

26. The system of claim 25, wherein the bearing support is removably mounted to the mandrel.

27. The system of claim 21, wherein the drive shaft includes a lubrication port in flow communication with the drive aperture, and wherein the mandrel includes a lubrication port in flow communication with the non-drive aperture.

28. A method of supporting a cylinder on a printing press comprising:

forming a drive side aperture in a drive end of the cylinder;

forming a non-drive side aperture in a non-drive end of the cylinder;

providing a cantilevered driveshaft mountable to a drive side of the frame and arranged for connection to a power source;

providing a cantilevered mandrel mountable to a non-drive side of the frame, the mandrel including a first portion having a first diameter and a second portion having a reduced diameter;

providing a drive coupling disposed inside the drive side aperture and operatively coupling the drive end of the cylinder to the drive shaft and permitting the driveshaft to support a first portion of the cylinder;

providing a first bearing set disposed within the drive side aperture, the first bearing set supporting the driveshaft; and providing a second bearing set disposed within the non-drive aperture and arranged to support a second portion of the cylinder, the second bearing set being mounted about the second portion of the mandrel.

29. The method of claim 28, including mounting the bearing set of the non-drive aperture on the mandrel with an outer race of the bearing set secured to an inner surface of the non-drive aperture.

30. The method of claim 28, wherein the drive coupling is formed by inserting across pin through the cylinder to intersect the drive shaft.

* * * * *